(12) United States Patent
Best

(10) Patent No.: US 7,239,108 B2
(45) Date of Patent: Jul. 3, 2007

(54) METHOD FOR STEPPER MOTOR POSITION REFERENCING

(75) Inventor: Eric P. Best, Brighton, MI (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/343,768

(22) Filed: Jan. 31, 2006

(65) Prior Publication Data

US 2006/0176007 A1 Aug. 10, 2006

Related U.S. Application Data

(60) Provisional application No. 60/648,832, filed on Jan. 31, 2005.

(51) Int. Cl.
*H02P 8/38* (2006.01)
(52) U.S. Cl. ............... 318/685; 318/696; 318/705; 318/714; 360/78.13
(58) Field of Classification Search ........... 318/685, 318/696, 45, 47, 705, 712, 714; 360/78.13
See application file for complete search history.

(56) References Cited

U.S. PATENT DOCUMENTS

| 4,314,146 | A | * | 2/1982 | Berney | 377/112 |
|---|---|---|---|---|---|
| 4,684,866 | A | * | 8/1987 | Nehmer et al. | 318/696 |
| 5,501,201 | A | * | 3/1996 | Miyoshi et al. | 123/568.24 |
| 5,839,957 | A | * | 11/1998 | Schneider et al. | 463/20 |
| 5,844,394 | A | * | 12/1998 | Mushika et al. | 318/696 |
| 5,877,694 | A | * | 3/1999 | Kataoka | 340/688 |
| 5,963,005 | A | * | 10/1999 | Yamaji | 318/685 |
| 6,222,340 | B1 | * | 4/2001 | Kawabata et al. | 318/685 |
| 6,680,597 | B1 | * | 1/2004 | Catellani et al. | 318/696 |
| 7,034,495 | B2 | * | 4/2006 | Sasaki | 318/685 |
| 2001/0035730 | A1 | * | 11/2001 | Yoshikawa et al. | 318/685 |
| 2006/0049791 | A1 | * | 3/2006 | Larsson | 318/685 |

\* cited by examiner

*Primary Examiner*—Rita Leykin
(74) *Attorney, Agent, or Firm*—Robert D. Marshall, Jr.; W. James Brady; Frederick J. Telecky, Jr.

(57) ABSTRACT

A method for referencing a polyphase stepper motor by monitoring the current step response in at least one driven phase is presented. The coil current step response is compared to past step responses in order to determine when an increase in or maximum load is present. A combination of step to step variance, step response variance from mean current magnitude, and average current magnitude variance, as well as other measures can be combined to create an algorithm output. The output is compared to a pre-determined threshold and if the value is greater than the threshold, the motor is commanded to halt its position, which remains magnetically synchronous. This position is then used as a reference point to zero, or to home the motor.

11 Claims, 3 Drawing Sheets

METHOD FOR STEPPER MOTOR POSITION REFERENCING

CLAIM OF PRIORITY

This application claims priority under 35 U.S.C. 119(e)(1) to U.S. Provisional Application No. 60/648,832 filed Jan. 31, 2005.

TECHNICAL FIELD OF THE INVENTION

The technical field of this invention is stepper motors which are position referenced to a fixed position such as a zero point or home using of a mechanic hard stop internal or external to the motor.

BACKGROUND OF THE INVENTION

There are many applications in which stepper motors need to be referenced to a fixed position such as a zero point or home position. These include instrumentation gauges used in automotive clusters, steppers used in medical equipment and positioning steppers used in industrial controls.

Stepper motors are typically run in an open loop position mode, where there is no position feedback from the motor shaft, the system output shaft or otherwise to determine the position of the motor. A stepper motor in this configuration is assumed to be magnetically synchronous at all times. Thus, the motor position is determined by the number of commanded pulses or commanded electrical angle movements. The simple and low cost operation of the stepper motor without position feedback is ideal for many applications such as automotive instrument cluster gauges, medical or scientific measurement systems, computer peripherals such as hard disk drives and printers and many industrial applications.

Since steppers are mostly run in an open position loop, a reference point is required to determine the initial start position of the motor. This position is determined by a mechanical hard stop, a proximity sensor or other equivalent sensor. In systems that do not use a sensor, the reference position is created by methods that may compromise the accuracy of the system. For instance, the motor is continuously run into a hard stop for a fixed time period to guarantee its position near the hard stop. This method suffers from several problems. First, there is time lost to guarantee that the motor has reached the hard stop. This is because the command must be at least equal to the entire length of travel for the stepper motor. Second, there is no guarantee that the motor has rested correctly at the hard stop.

Another method for homing a stepper motor monitors the back-EMF in a non-driven phase of the motor to detect a stall condition. This method is disadvantageous because it waits for the motor to lose synchronism. Depending on the motor and gearing system, the motors rotor could kick back or become unstable at this point. Thus it might incur a position error. This back-EMF detection method could stop the motor before it loses synchronism. However, this sensing depends on a flexible plastic gearing system and a very sensitive threshold value, which is not immune to noise. In a method using a simple fixed threshold, a transient noise spike could cause a false detection point. For small motors with low back-EMF constants, stall detection requires being able to detect tens of millivolts. This requires a high signal to noise ratio in the measurement system.

Homing of a stepper motor is significant to normal operation. For instance, a speedometer must present the correct speed, where the pointer is referenced to a marking on the instruments display. An industrial labeler must place a label at the correct location. Position errors, homing sequence time and system cost and complexity of required sensors could be alleviated by an accurate and robust method for stepper referencing.

SUMMARY OF THE INVENTION

This invention is a method to provide robust zero point detection. This method senses the coil current of the stepper motor. The current step response is analyzed for its step response to step response variation, step response to mean variation, average current magnitude variation and settling time. Together these real time measurements provide a robust means to determine when a stepper motor has reached a hard stop and an increase in load.

For automotive instrument clusters, the gauge needle is typically referenced using voltage sensing. This former method examined the induced voltage on the non-driven phase of the stepper motor to determine the present or lack of back-EMF. This invention uses current sensing of the current of the driven stepper motor phase.

This invention actually detects the last point of travel of a stepper motor before it stalls. In this case a stall indicates loss of synchronism. The prior methods detect a change in back-EMF after the motor stalls. An instrumentation stepper motor has a tendency to kick back off of the hard stop after it stalls. The invention increases positioning accuracy by eliminating the problems associated with motor kick back. When sensing the back-EMF in the undriven coil of a stepper sequence, the relative phase of the back-EMF may present additional sensitivities due to uncertainty whether the voltage is negative going or positive going. The former method uses a single voltage measurement attempting to determine changes as small as 10 millivolts. This requires a high signal to noise ratio. This invention uses multiple measurements to ensure robustness and requires less signal to noise.

This invention uses the fact that in most stepper systems there is a short time in which the system load increases before motor stall and lose of synchronism. This load increase may be due reduction gearing, drive belts, compression in fittings or the equivalent. This invention needs a least one step pulse in which the load is increased. A typical instrumentation stepper motor with built in reduction gear, may have 3 or 4 pulses during which the load is increasing. This invention examines the current step response of the motor. During normal operation before a load increase, the current step responses are fairly consistent from step to step within a given current direction and phase. The direction and phase of the current step response can change due to coil parameter changes, FET parameter changes and other factors. This invention uses the step to step variation as a measure. As the load increases, the current step response becomes more critically damped. This results in a more square step response with less overshoot, less undershoot and less ringing. As the load increases, the current will initially decrease from the previous step due to the slowing of the system and eventually increase once the max load pulse is instantiated. The combination of these factors provides a robust measure of increased load and thus a solid, repeatable reference point in a system. The motor velocity and the various measures can be calibrated so that the motor is halted before the motor loses synchronism.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
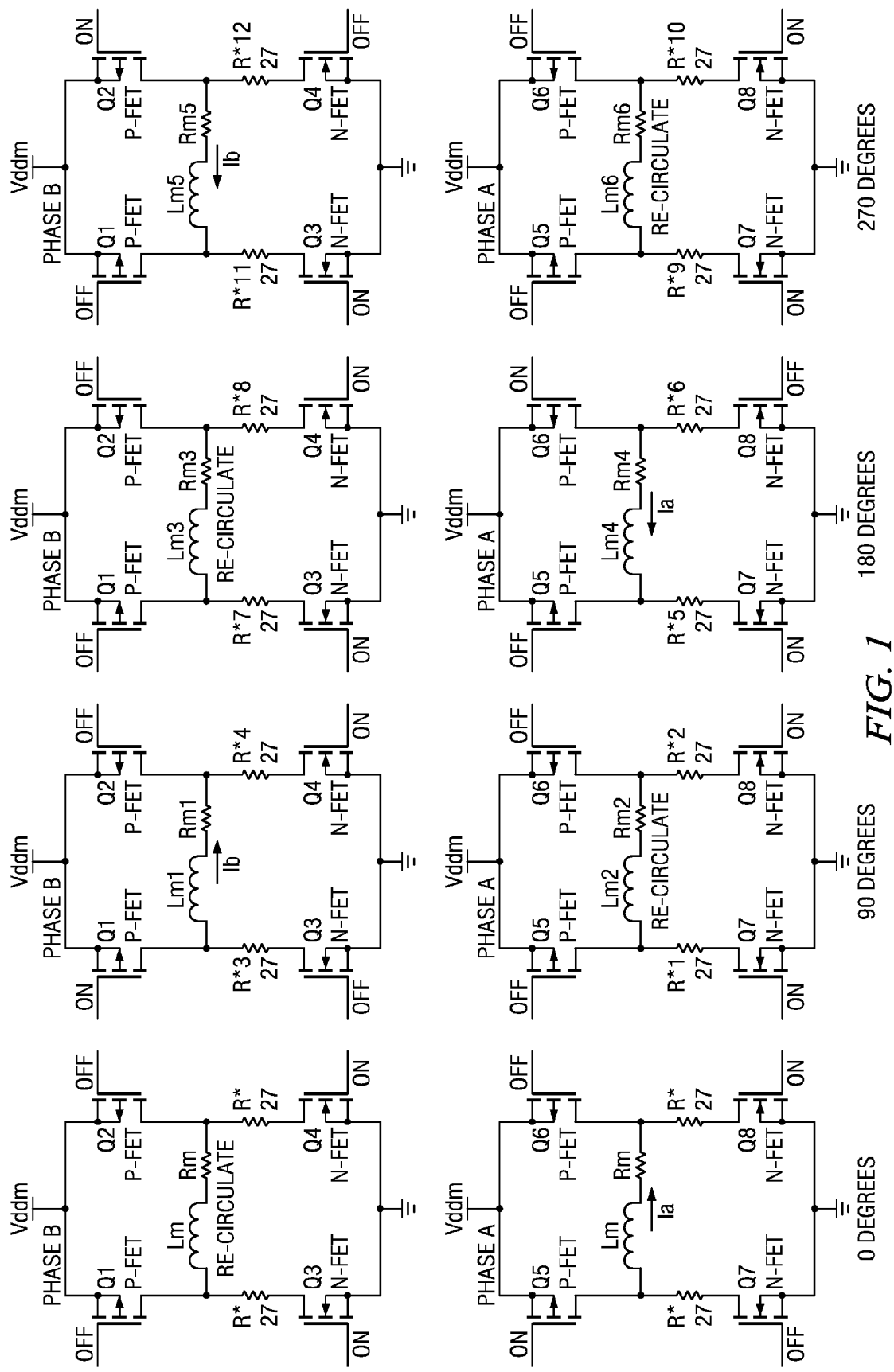
FIG. 1 illustrates a full stepping sequence of a two phase stepper motor with the motor coils being driven by discrete H-bridge circuits showing the four step states of 0°, 90°, 180°, and 270° used in full stepping.

A stepper motor control system can be driven in many different fashions. For the explanation of this invention, the standard H-bridge architecture will be described with full stepping mode. A stepper motor can be driven in full step mode as shown in FIG. 1. There are four step states in this mode (0°, 90°, 180°, 270°), which correspond to the electrical angle of the motor within a given pole pair. These step states will be used as references in this description.

Figure 2:
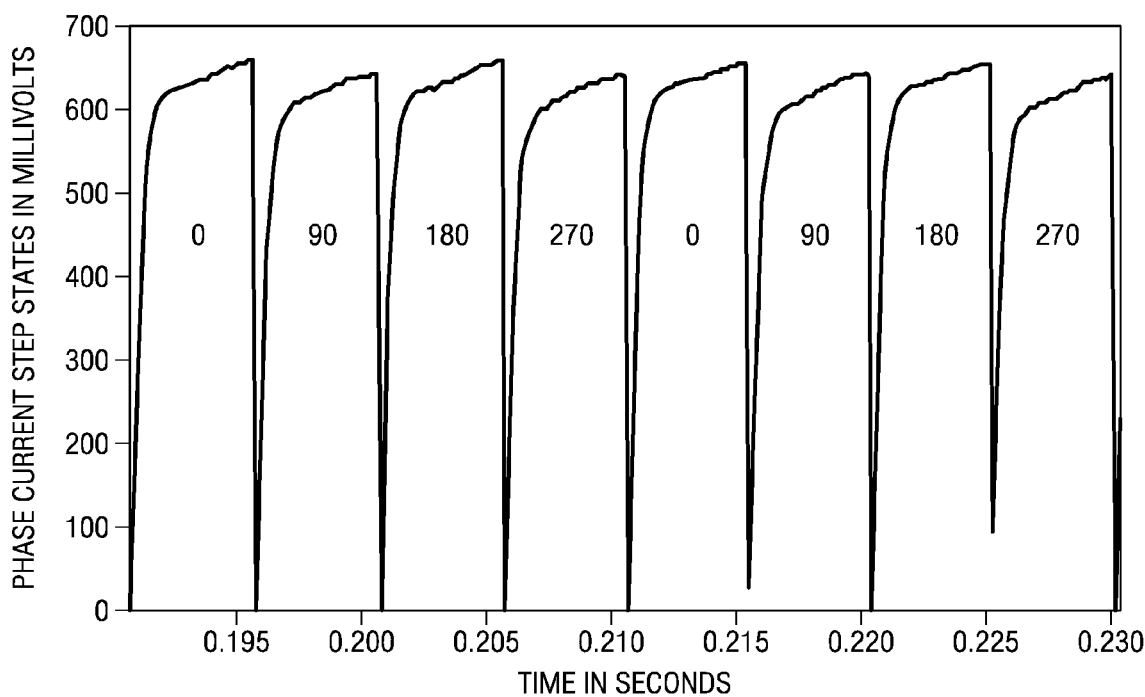
FIG. 2 illustrates the current step response of a single phase of a two phase stepper motor as it is stepped through the four full steps that represent one complete electrical cycle with full steps occurring at a constant frequency.
Figure 3:
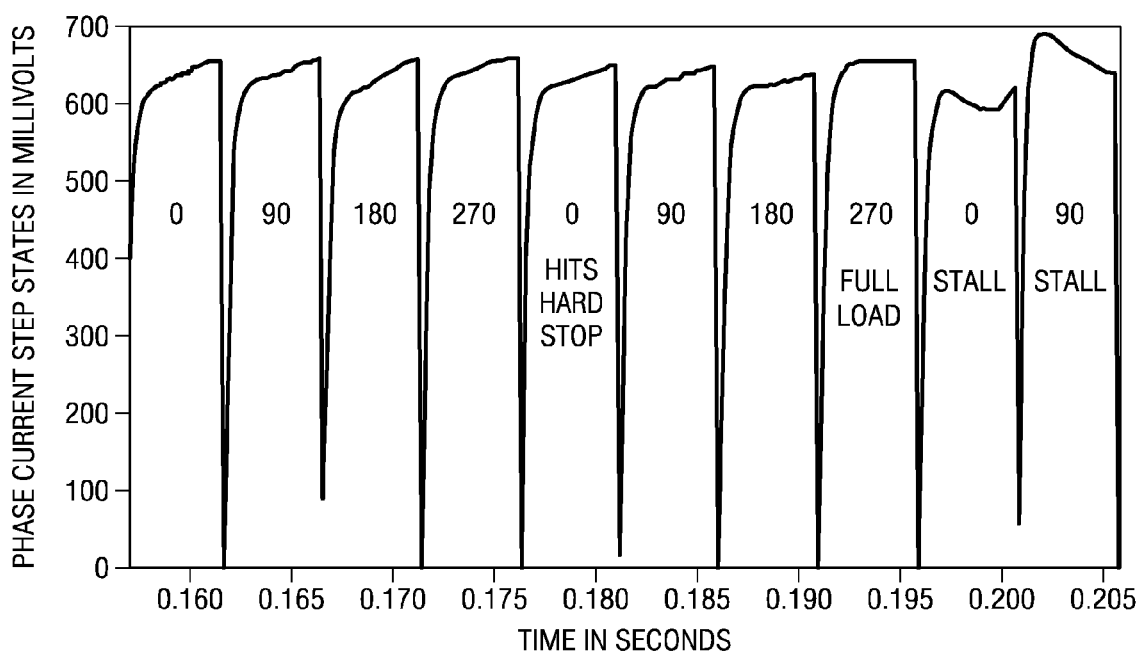
FIG. 3 illustrates the effect of a motor reaching a hard stop and eventually stalling with full steps occurring at a constant frequency.

While the motor is full stepping at a constant velocity with the steps changing state at a fixed rate, the step response to step response variance between step states will be relatively low. For instance, the step response during step state=0° will be similar to four steps prior, the last time the motor was at this step state. FIG. 2 depicts the constant step to step nature as described. In a system that exhibits a gradual increase of load due to reduction gearing, belt slack, fitting compression and the like, the step response alters as the motor nears a hard stop. For certain gearing systems and velocities, the step response will at first produce a step with a lower average current magnitude than the previous current for the given step state. Also, the step response will start to become more critically damped. This phenomenon becomes more prevalent until the current step response is critically damped and the average magnitude current is greater than the previous step states average magnitude current. After this critically damped step response, the motor will lose synchronism. FIG. 3 illustrates this gradual process is shown in FIG. 3. The 270° step that starts at 0.191 seconds is a critically damped step response that corresponds to the final step before loss of synchronism. FIG. 3 shows that the step response is greatly different at the critically damped pulse than for the four pulses previous. A gradual effect is seen from the step noted as hit hard stop until the critically damped pulse.

Figure 4:
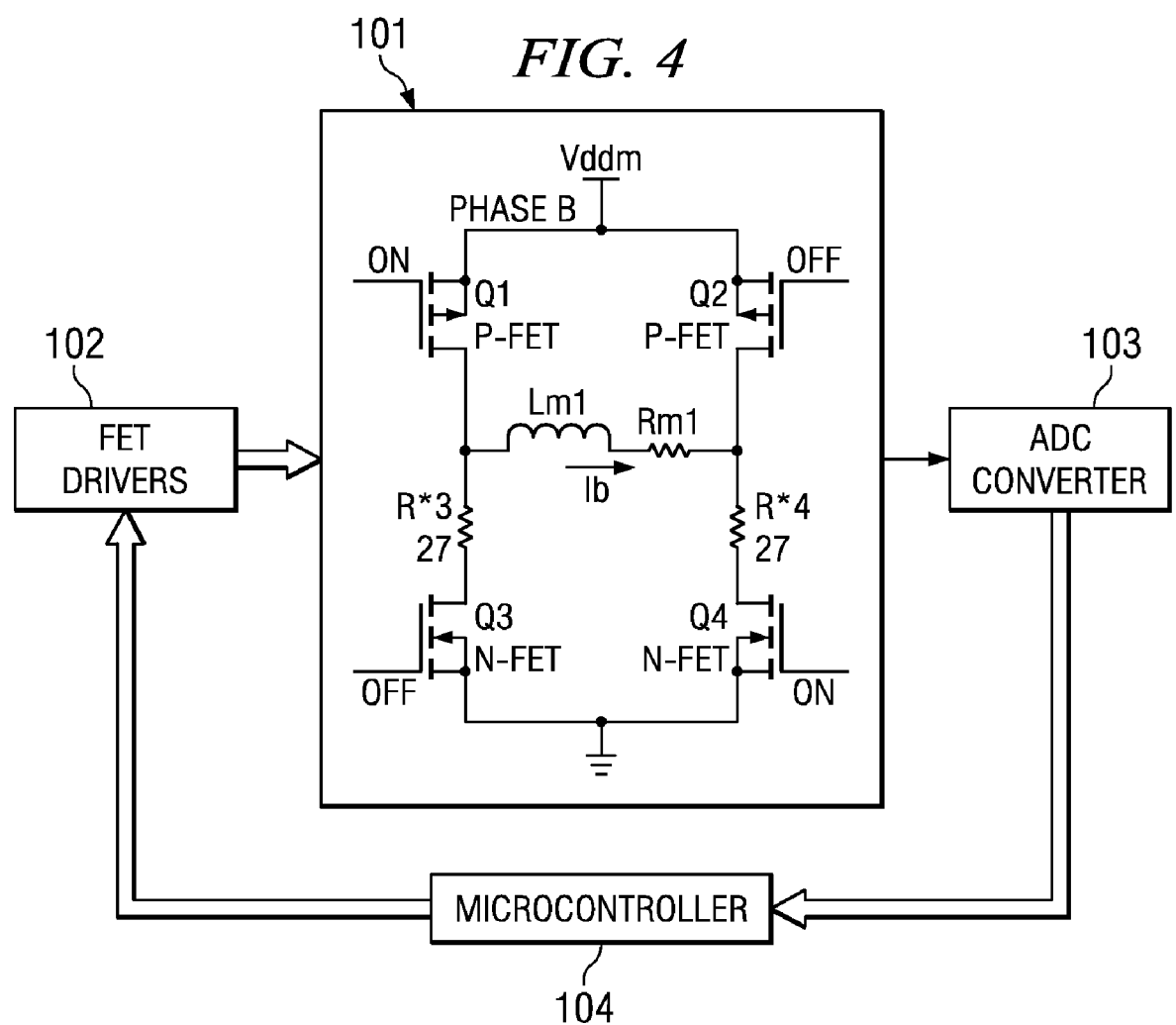
FIG. 4 illustrates a block diagram of the system of this invention.

FIG. 4 illustrates the system of this invention. The system includes H bridge 101 including the control FETs and the load representing the motor winding. The ON and OFF operation of the FETs is controller by FET drivers 102. Analog-to-digital converter 103 receives sensing voltages from H bridge 101 and generates a digital signal supplied to microcontroller 104. Microcontroller 104 performs normal motor control functions via FET drivers 102 according to the particular motor control application. In accordance with this invention microcontroller 102 senses the hard stop for synchronization based on the digital data supplied by analog-to-digital converter 103. Microcontroller 104 is a programmable microprocessor or digital signal processor with memory and a program for the desired motor control including the stop synchronization of this invention.

An algorithm can be formed around the step response by sampling the step response through an analog-to-digital converter (ADC) 103 and processing the information digitally in microcontroller 104. This can employ a current sense resistor with a differential amplifier, a Hall Effect sensor or reading the voltage across the correct N-channel FET during the appropriate step sequence. Any method of current sensing will provide the same results as long as the steps are properly correlated to the step states. Thus this method is not restricted to any particular current sensing technique.

Once data is acquired by any of these techniques, the load detection algorithm is triggered. Samples of the steps can be reduced to the flat top portion of the current waveform, discarding the initial rising slope information. In some cases, this rising slope information can be used as well. The algorithm can produce an output based on multiple conditions, leading to a robust detection scheme rather than relying on a single measurement. Depending on the number of steps that occur between reaching the hard stop and the motor actually losing synchronism, a combination of the follow may be used.

First, the step to step response variance from the previous step can be used as a measure. This is actually the step to step response of a given step state to the next similar step such as from a 90° step to the next 90° step and not from one step to the next such as from a 90° step to a 180° step. Thus, old data from 4 steps prior must be preserved for use in this measure. For n samples, the step to step variance is measured as:

$$\sum_{x=1}^{n} (\text{data\_new}[x] - \text{data\_old}[x])^2$$

This measure could also be taken as an absolute value. The inventor believes the squared value above produces better results. When the individual sample points vary from the previous samples of the given step state, the variance will increase greatly. This data can also be saturated to a maximum limit or gated to a minimum limit to maintain correct dynamic range.

Another measure is the actual step response variance from the mean of the samples from the top of the step response. This measure determines the flatness of the step response and can be uses to search for a critically damped pulse. This can mathematically be expressed as:

$$\sum_{x=1}^{n} (\text{data\_new}[x] - \text{data\_new\_mean})^2$$

As the step response takes on a more critically damped response, the samples will be near the mean throughout the response and this measure will decrease greatly. For a perfectly flat step response, this measure will be zero. If this measure is used in the algorithm, the relationship could be inverted so that a flatter curve would then produce a larger value to allow for faster processor mathematics by substitution of multiplication for division. This value can also be saturated or gated.

Another measure to detect the fully loaded step is to examine the average step response current magnitude difference from the previous step of the same step state. For certain gearing schemes, as the motor initially hits the hard stop, the average current magnitude will decrease from the previous step state step. This trend will continue until the motor has reached the final step before stall. At that point the average current magnitude will rise distinctly. This data can be easily formatted such that an average current magnitude decrease is a relatively small number and a current magnitude increase is a relatively large number. Mathematically, this is:

Average_Current_Magnitude_Difference=data_new_mean_data_old_mean

This measure is dependent on the step response nature of the motor. Typically, the step response of a motor will be under-damped at lower velocities. As the velocity increases, the damping will switch to critically damped and eventually over-damped. This measure works best at velocities that provide an over-damped step response under normal operation.

Another measure is the time it takes for the step response to settle to within 2% or some other fixed percentage of its average value. In the critically damped case, this settling time will be shorter than the settling time of a step response prior to reaching the hard stop.

Depending on the nature of the system, these measures can be combined and weighted to produce a strong correlation to the fully loaded pulse. For instance, the algorithm output could be:

Algorithm Output=(Step Response to Step Response Variance)*(Step Response to Mean Variance)*(Average Current Magnitude Increase)*(Settling Time)

This is not the only possible combination of these measures. Any one of these or any combination of these measures can be used to adequately provide a detection scheme. The robustness of the system over voltage, temperature, and component variation will dictate the weighting and use of these measures. The presented system has proven to provide an accurate and robust means for referencing a stepper motor to a hard stop.

What is claimed is:

1. A method of referencing a stepper motor to a mechanical hard stop comprising the steps of:
   measuring the motor coil electrical current step response in each driven phase; and
   comparing motor coil electrical current step response for a current driven phase with a statistical measure of motor coil electrical current step responses for prior driven phases; and
   determining the stepper motor has reached a reference position at a hard stop when variation said electrical current step response relative to said statistical measure of prior motor coil electrical current step responses meet a predetermined criteria.

2. The method of claim 1, wherein:
the motor employs a direct drive.

3. The method of claim 1, wherein:
the motor employs a gearing system.

4. The method of claim 3, wherein:
the gearing system includes reduction gearing.

5. The method of claim 1, wherein:
the motor employs a pulley system.

6. The method of claim 1, wherein:
the motor coil electrical current step response is altered at least one full step before the loss of synchronism.

7. The method of claim 1, wherein:
said step of comparing motor coil electrical current step response compares the motor coil electrical current step response of the current drive phase to the previous motor coil electrical current step response of a prior driven phase of the same electrical angle.

8. The method of claim 1, wherein:
said step of comparing motor coil electrical current step response compares a portion of the motor coil electrical current step response of the current drive phase to the mean of a corresponding portion of the motor coil electrical current step response of prior driven phases; and
said step of determining the stepper motor has reached a reference position at a hard stop determines when said portion of the motor coil electrical current step response of the current drive phase differs from the mean of a corresponding portion of the motor coil electrical current step response of prior driven phases by more than a predetermined amount.

9. The method of claim 1, wherein:
said step of comparing motor coil electrical current step response compares the motor coil electrical current step response of a current driven phase to an average magnitude motor coil electrical current differential between successive driven phases of a same electrical angle; and
said step of determining the stepper motor has reached a reference position at a hard stop determines when said motor coil electrical current step response of a current driven phase differs from said average magnitude motor coil electrical current step response differential between successive driven phases of a same electrical angle by more than a predetermined amount.

10. The method of claim 1, wherein:
said step of comparing motor coil electrical current step response compares the motor coil electrical current step response settling time of a current driven phase to a mean motor coil electrical current step response settling time; and
said step of determining the stepper motor has reached a reference position at a hard stop determines when the motor coil electrical current step response settling time of a current driven phase differs from the mean motor coil electrical current step response settling time by more than a predetermined amount.

11. The method of claim 1, wherein:
said step of comparing motor coil electrical current step response compares an oscillation frequency of the motor coil electrical current step response of the current driven phase to a mean oscillation frequency of motor coil electrical current step responses of prior driven phases; and
said step of determining the stepper motor has reached a reference position at a hard stop determines when said oscillation frequency of the motor coil electrical current step response of the current driven phase differs from said mean oscillation frequency of motor coil electrical current step responses of prior driven phases by more than a predetermined amount.

* * * * *